Figure 1:
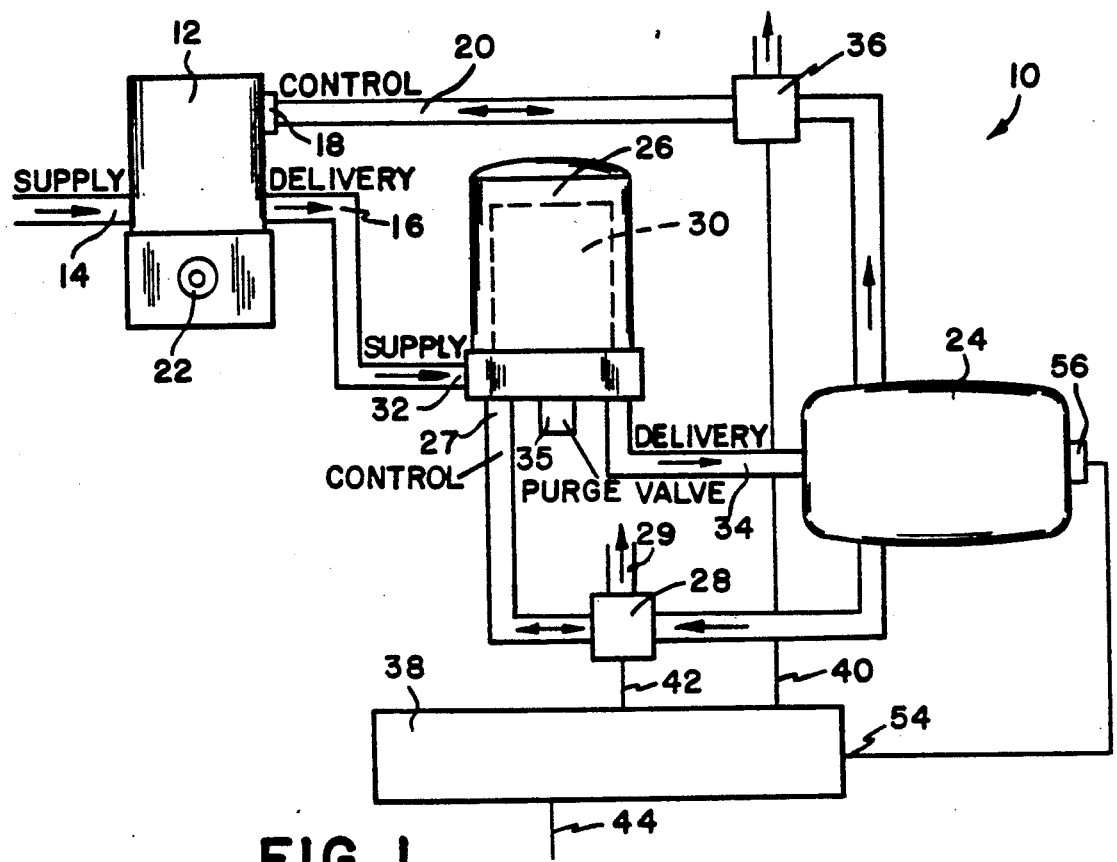

United States Patent [19]

Cramer et al.

[11] Patent Number: 5,027,529
[45] Date of Patent: Jul. 2, 1991

[54] CHARGE/PURGE CONTROL SYSTEM FOR AIR DRYER HAVING LIMITED CHARGE TIME

[75] Inventors: Kenneth L. Cramer, Jamestown, N.Y.; Robert D. Krieder, Sullivan, Ohio

[73] Assignee: Allied-Signal Inc., Morristown, N.J.

[21] Appl. No.: 508,765

[22] Filed: Apr. 12, 1990

Related U.S. Application Data

[63] Continuation-in-part of Ser. No. 301,427, Jan. 26, 1989, Pat. No. 4,936,026.

[51] Int. Cl.$^5$ .............................................. F26B 19/00
[52] U.S. Cl. .......................................... 34/53; 34/80
[58] Field of Search .................... 34/53, 80, 27, 33; 303/85, 59, 60, 61; 55/213, 212

[56] References Cited

U.S. PATENT DOCUMENTS 2,834,638  5/1958  George .
3,402,972  8/1966  Cooper et al. .
3,726,307  4/1973  Carman et al. .
4,083,608  4/1978  Shirey .
4,524,311  6/1985  Yokota et al. .
4,652,801  3/1987  Burdett .

Primary Examiner—Henry A. Bennet
Assistant Examiner—Denise L. F. Gromada
Attorney, Agent, or Firm—Ken C. Decker; William N. Antonis

[57] ABSTRACT

A compressed air system includes an electronic control which controls enabling and disabling of the compressor in response to pressure level variations in the system storage reservoir. The control unit responds to compressor disabling by causing the system air dryer to regenerate or purge for a predetermined time period. The timing period of a charge timer is initiated when the compressor is enabled. When the charge timer has timed out, the compressor is disabled and the air dryer purged for the predetermined time period.

12 Claims, 1 Drawing Sheet

CHARGE/PURGE CONTROL SYSTEM FOR AIR DRYER HAVING LIMITED CHARGE TIME

This application is a continuation-in-part of U.S. patent application Ser. No. 301,427, filed Jan. 26, 1989, now U.S. Pat. No. 4,936,026.

This invention relates to a system for controlling the charging and purging cycles of an air dryer used in a compressed air system.

Compressed air systems are used to operate many mechanical devices, and are particularly useful for operating braking systems for heavy vehicles and for operating industrial controls. These systems include an air compressor which compresses ambient air and charges a storage reservoir. In a compressed air braking system, the air compressor is operated by the engine of the vehicle. A governor is responsive to the pressure in the reservoir for unloading or disabling the compressor when the pressure level in the storage reservoir attains a predetermined pressure level, The governor enables or loads the compressor when the pressure in the reservoir drops to a predecided reference level. Some compressors used on automotive vehicles are powered through an electromagnetic clutch which is engaged and disengaged in response to the pressure level in the storage reservoir to thereby disable and enable the air compressor.

It has become common to provide compressed air systems with an air dryer, which drys the compressed air generated by the air compressor before it is communicated to the storage reservoir. These air dryers commonly provide a desiccant through which the air is communicated. A small quantity of air is segregated, and is used to regenerate or purge the desiccant when the compressor is disabled. However, existing systems use air dryers in which the desiccant is purged continually at all times while the compressor is unloaded or disabled. However, compressed air systems are used in a variety of applications having compressor loading cycles which vary widely. For example many such compressed air systems are used to operate the braking systems of large, line haul trucks, which are operated at highway speeds continually for hours at a time. The compressor on such vehicles may be unloaded or disabled for ninety percent or more of the time that the vehicle is operated. This means that the purge valve is opened almost continuously, thereby venting not only the desiccant to atmosphere, but also venting the line communicating the inlet of the air dryer with the outlet of the compressor. Since it is common to connect the inlet of the compressor with the outlet of the turbocharger so that the compressor is initially supplied with air at or above atmospheric pressure, the open purge control valve in the air dryer during regeneration of the desiccant provides a path for this compressor inlet air to be vented to atmosphere. This reduces the operating efficiency of the vehicle engine if the vehicle is equipped with a turbocharger or supercharger.

Such compressed air systems are also used to operate the brakes, doors, etc. of transit busses. These vehicles require large quantities of compressed air and the air compressors are unloaded infrequently. Since the air dryer can be purged only when the air compressor is unloaded or disabled, the air quality in systems with long charging cycles is diminished, with detrimental effects on the air activated appliances.

The present invention solves the problems inherent in the mechanical purge valve used on prior art air dryers by providing an electronic control which controls the charging and purging cycles of the air dryer. The control assures that the purge valve will not remain open longer than necessary to regenerate the desiccant, and also assures that the air dryer is purged at regular intervals, provided that the pressure level in the reservoir remains above a minimum safe pressure level.

Figure 2:
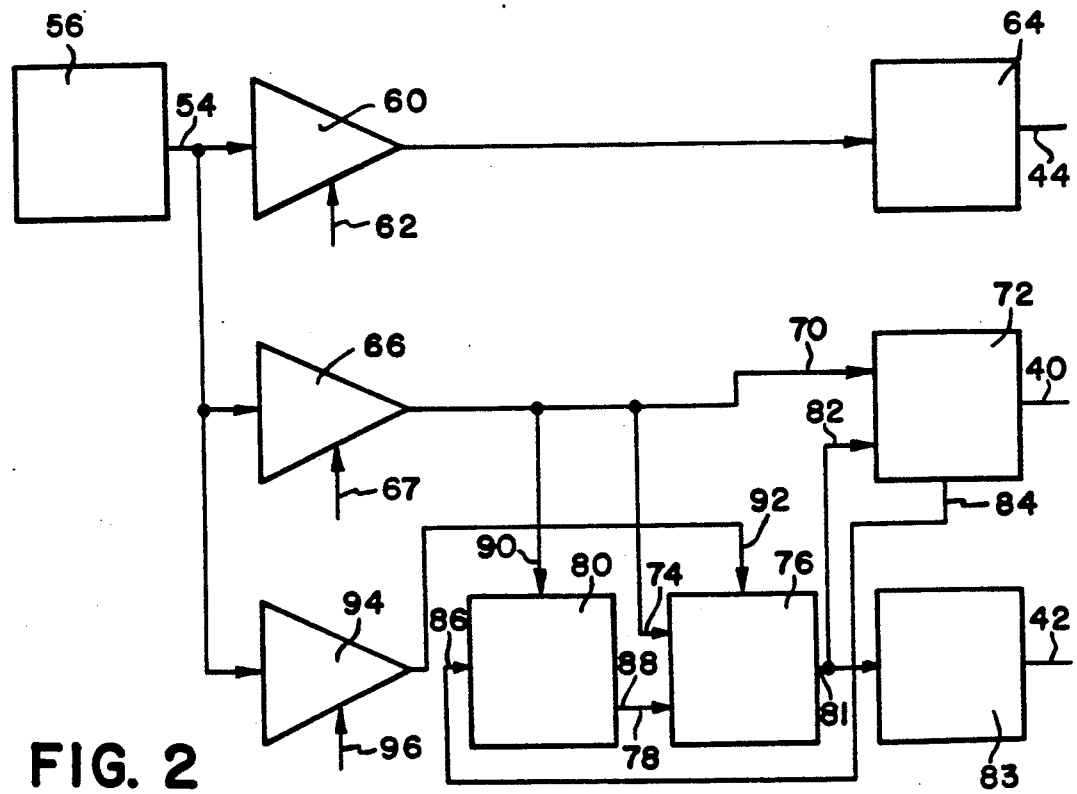

These and other advantages of the present invention will become apparent from the following description with reference to the accompanying drawings in which:

FIG. 1 is a diagrammatic illustration of a compressed air system with an air dryer charge/purge control made pursuant to the teachings of the present convention; and FIG. 2 is a schematic illustration of the electronic control system used in the compressed air system of FIG. 1.

Referring now to the drawing, a compressed air system generally indicated by the numeral 10 includes a conventional automotive air compressor 12 having an inlet or supply 14, an outlet or delivery 16, and a conventional unloader 18 which unloads the compressor 12 during periods when compressed air is not needed. The unloader 18 responds to a pressure signal communicated thereto through line 20 to load and unload the compressor 12. The compressor 12 is powered by the engine (not shown) of the vehicle through a drive pulley 22. Alternatively, the pulley may include an electromagnetic clutch mechanism of conventional design in lieu of the unloader 18. Accordingly, the compressor 12 is then disabled and enabled by actuation and disengagement of the electromagnetic clutch 22 instead of by the unloader 18. The inlet or supply 14 may be communicated with ambient air through an air cleaner (not shown) or, if the engine operating the air compressor 12 is equipped with a turbocharger or supercharger, the inlet 14 may be communicated to the pressurized air at the outlet of these devices.

The outlet or delivery 16 of the air compressor 12 is communicated to a conventional storage reservoir 24 through an air dryer 26. The air dryer 26 includes a cannister of desiccant material 30 which is enclosed within the air dryer housing. An inlet or supply 32 communicates air into the air dryer 26, and an outlet or delivery 34 communicates air into a conduit communicating with the storage reservoir 24. A purge valve 35 communicates the air dryer 26 to atmosphere to purge the desiccant. The purge valve 35 is actuated to purge the air dryer by a pressure signal communicated to control port 27.

A conventional solenoid valve 36 is installed in the line 20 which communicates the storage reservoir 24 with the control port of the unloader 18. Solenoid valve 36 is controlled by an electronic control unit 38. Electronic control unit 38 will be described in detail later herein with respect to FIG. 2. Electronic control unit 38 includes an output 40, which is connected to the solenoid valve 36, another output 42, which is connected to a purge control valve 28, which is also solenoid actuated, and a third output 44 which is connected to a warning device (not shown), which is mounted in the operator's compartment. The solenoid valve 28 is a conventional three-way solenoid valve which in its unactuated condition vents the control port 27 of air dryer 26 to atmosphere vent 29 and closes communication between valve 28 and the reservoir 24. However, when a signal is generated on output 42, valve 28 is actuated so that the vent 29 is closed and communication is initiated between reservoir 24 and control port 27, thereby purging the air dryer 26. Electronic control unit 38 further includes an input 54 which is connected to a conventional pressure sensor 56 which measures the pressure level in the storage reservoir 24 and generates a pressure signal which varies in accordance therewith.

Referring now to FIG. 2, the details of the electronic control unit will be described in detail. The signal from sensor 56, which is received on input terminal 54 is transmitted to low pressure warning comparator 60. Comparator 60 compares the output of sensor 56 with a predetermined reference value received at input 62 and generates an output signal when the value of the signal generated by sensor 56 drops below the threshold set at input 62. The output signal from comparator 60 actuates low pressure warning signal driver 64, which generates a signal on terminal 44 which actuates the low pressure warning indicator.

The output of sensor 56 is also transmitted to compressor unloading comparator 66, which compares the output of sensor 56 with a predetermined threshold value set on input 67. When the output of sensor 56 exceeds the threshold level set on 67, comparator 66 generates a pressure control signal which is transmitted to terminal 70 of a compressor unloader driver 72. Compressor unloader driver 72, in response to the pressure control signal on the terminal 70 thereof, generates a compressor control signal on the terminal 40, which is transmitted to the solenoid valve 36. Solenoid valve 36 responds to the compressor control signal to open communication between the reservoir 24 and the input port of the unloader 18, thereby transmitting a signal causing it to unload the compressor 12. In the alternate embodiment wherein the drive pulley 22 includes an electromagnetic clutch, the terminal 40 would be connected directly to the clutch to cause the clutch to disconnect the compressor 12 from driving engagement with the vehicle engine. When the pressure control signal is generated by comparator 66, the reference level at 67 is shifted to a predecided reference level which is lower than the predetermined pressure level in a manner well known to those skilled in the art. Accordingly, the pressure control signal is terminated when the pressure signal drops below the predecided pressure level.

The output of comparator 66 is also connected to input terminal 74 of an air dryer purger timer 76. Another input terminal 78 of air dryer purge timer 76 is connected to the output of a charging timer 80. Air dryer purge timer 76 is responsive to signals on either terminal 74 or 78 thereof to generate a control signal on output terminal 81. The signal on output terminal 81 is transmitted to an air dryer purge driver 83, which generates a purge control signal on its output terminal 42 which actuates the solenoid valve 28, thereby effecting purging of the air dryer. The signal on terminal 81 is also transmitted to input terminal 82 of the compressor unloader or disabling driver 72. Compressor unloader or disabling driver 72 responds to a signal on either terminal 70, 82 to generate the compressor control signal on the terminal 40.

As will be discussed hereinbelow, the compressor control signal on terminal 40 is terminated and the compressor is enabled or loaded when the signals on both terminals 78 and 82 are extinguished. When this occurs, compressor unloader or disabling driver 72 generates a signal at terminal 84 thereof which indicates that the compressor is back on load or enabled. This signal is transmitted to input terminal 86 of charging timer 80. Charging timer 80 consists of a conventional resistance capacitor (RC) circuit in which the resistor is replaced by a thermistor so that the period of the timer 80 varies as a function of ambient temperature.

Charging timer 80 generates a signal on its output terminal 88, which is connected to input terminal 78 of air dryer purge timer 76, at a predetermined time period after the compressor control signal on terminal 40 is terminated, which occurs when the compressor is enabled or brought back on load. Charging timer 80 responds to a signal at reset terminal 90 thereof to reset the charging timer 80. The terminal 90 is connected to the output of the comparator 66. Accordingly, the charging timer 80 is reset if the pressure control signal is again generated before the period of the charging timer 80 timers out.

Air dryer purge timer 76 is also equipped with a reset terminal 92. Terminal 92 is connected to the output of a low pressure comparator 94. The input of low pressure comparator 94 is connected to the pressure signal at terminal 54 and compares the pressure signal at terminal 54 with a predetermined reset pressure level at input 96 of comparator 94. The reference level at 96 is a low pressure level representing a dangerously low pressure condition in the reservoir 24.

In operation, the compressor unloading or disabling driver 72 responds to signals on either of its input terminals 70, 82 to generate a compressor unloading or disabling signal on terminal 40. Accordingly, the compressor is unloaded when the pressure level in the reservoir attains the predetermined pressure level established at input 67 of comparator 66, thereby generating the pressure control signal which is transmitted to terminal 70 and effects compressor unloading or disabling.

The compressor control signal is also transmitted to input 74 of purge timer 76. Purge timer 76 responds to the signal on terminal 74 to generate a signal on terminal 80 thereof. The air dryer purge driver 82 responds to the signal from the timer 76 to generate a purge control signal on the terminal 42. The signal on terminal 42 actuates solenoid valve 28 to effect purging of the air dryer. The terminal 80 is also connected to the terminal 82 of the compressor unloader or disabling driver 72. Accordingly, even if the pressure control signal from comparator 66 terminates before the timer 76 times out and the compressor would normally be thereupon put back in the loaded or enabled condition, the compressor is nevertheless maintained in the disabled or unloaded condition because the signal from terminal 80 is also transmitted to the terminal 82. Accordingly, whenever the compressor is unloaded by the pressure control signal, the air dryer is purged for the time period of the timer 76, unless the pressure level in the reservoir 24 drops below the reset pressure level at input 96 of low pressure comparator 94. If this occurs, the timer 76 is reset by the signal at terminal 92, thereby terminating the signal at terminal 82 and permitting the compressor to be enabled or loaded.

When the compressor unloader or disabling driver 72 is turned off, thereby again enabling or permitting the compressor to come back on load, a signal is generated at output 84, which is transmitted to input 86 of charging timer 80. The charging timer 80 responds to the signal at input 86 to initiate a timing cycle of the charging timer 80. When timer 80 times out, a signal is generated at output 88 thereof. Since, as discussed above, the period of timer 80 is varied as a function of ambient temperature, the period of timer 80 will be shorter at high ambient temperatures and longer at low ambient temperatures. Accordingly, the air dryer will be purged more often at high ambient temperatures when a larger quantity of moisture will be contained in the compressed air and the air dryer will be purged less often at low ambient temperatures when the air contains a lower quantity of moisture.

The air dryer purge timer 76 responds to a signal at input 78, which is connected to terminal 88 of charging timer 80, to generate the signal at output 81 which turns on the compressor unloaded or disabling driver 72 and also turns on the air dryer purge driver 83, thereby initiating a purge cycle of the air dryer for a period of time equal to the period of the timer 76. Accordingly, even if the pressure level in the reservoir never attains the predetermined level causing comparator 66 to generate a pressure control signal, the air dryer is nevertheless purged at regular intervals equal to the period of the timer 80, unless the pressure in the reservoir drops to a dangerously low level set by the reset pressure level at 96. Accordingly, if pressure does drop to this low level, the purge timer 76 is reset to terminate the purge cycle and permit the compressor to come back on load.

Since the air dryer is purged at regular intervals (assuming that the pressure in the reservoir remains above the relatively low reset pressure), high quality compressed air that is relatively moisture free even in applications in which large quantities of air are consumed is assured. However, the pressure level in the system is not allowed to reach a dangerously low level at any time because of the resetting of the purge timer when the pressure of the reservoir drops to a dangerously low level, thereby terminating the purging of the air dryer and permitting the compressor to come back on load.

We claim:

1. Compressed air system comprising an air compressor for compressing air, a storage reservoir for storing compressed air, said air compressor having a compressed air outlet connected to said storage reservoir, and disabling means responsive to a compressor control signal for disabling said air compressor in response to said compressor control signal and for enabling said compressor in response to termination of the compressor control signal, means responsive to the pressure level in the reservoir for generating a pressure control signal when the pressure level in the storage reservoir attains a predetermined pressure level and for terminating said pressure control signal when the pressure level in the reservoir drops to a predecided pressure level, an air dryer connected between the compressed air outlet and said storage reservoir for removing entrained moisture in the compressed air communicated to said storage reservoir, said air dryer including a desiccant requiring periodic purging when said compressor is disabled, purge valve means responsive to a purging control signal for purging said desiccant, timer means responsive to enabling of said compressor for generating a timer control signal a predetermined time period after the compressor is enabled, and signal generating means responsive to said timer control signal and said pressure control signal for generating said compressor control signal and said purge control signal in response to either said timer control signal or said pressure control signal.

2. Compressed air system as claimed in claim 1, wherein said signal generating means includes a timing device responsive to the timer control signal from said timer means for limiting generation of said compressor control signal and said purge control signal to a predecided time period after said timer control signal is generated.

3. Compressed air system as claimed in claim 2, wherein said signal generating means includes means for responding to said pressure control signal to reset said timing device and to maintain said compressor control signal for as long as said pressure control signal is generated.

4. Compressed air system as claimed in claim 3, wherein said system includes means for inhibiting said purging control signal and the compressor control signal if the pressure level in the reservoir is below a reset pressure level.

5. Compressed air system as claimed in claim 4, wherein said means for inhibiting includes comparing means for comparing said pressure signal with a reset pressure level and generating an output signal resetting said timing device when the pressure level in the reservoir drops below said reset pressure level.

6. Compressed air system as claimed in claim 1, wherein said timer means includes means for varying said predetermined time period as a function of temperature whereby said predetermined time period is longer at lower temperatures and shorter at higher temperatures.

7. Compressed air system as claimed in claim 6, wherein said signal generating means includes a timing device responsive to the timer control signal from said timer means for limiting generation of said compressor control signal and said purge control signal to a predecided time period after said timer control signal is generated.

8. Compressed air system as claimed in claim 1, wherein said signal generating means includes means for responding to said pressure control signal to reset said timer means when the pressure level in the reservoir drops below said predecided pressure level.

9. Compressed air system comprising an air compressor for compressing air, a storage reservoir for storing compressed air, said air compressor having a compressed air outlet connected to said storage reservoir, and disabling means responsive to a compressor control signal for disabling and enabling said air compressor in response to said compressor control signal, means responsive to the pressure level in the reservoir for generating a pressure control signal when the pressure level in the storage reservoir attains a predetermined pressure level and for terminating said pressure control signal when the pressure level in the reservoir drops to a predecided pressure level, an air dryer connected between the compressed air outlet and said storage reservoir for removing entrained moisture in the compressed air communicated to said storage reservoir, said air dryer including a desiccant requiring periodic purging when said compressor is disabled, purge valve means responsive to a purging control signal for purging said desiccant, signal generating means responsive to said pressure control signal for generating said compressor control signal and said purge control signal, and means for periodically generating said compressor control signal and said purge control signal in the absence of the pressure control signal.

10. Compressed air system as claimed in claim 9, wherein said last mentioned means includes timer means reset by said pressure control signal, said signal generating means including means responsive to said timer means to generate said compressor control signal and the purge control signal for a predetermined time period in the absence of the pressure control signal.

11. Compressed air system as claimed in claim 10, wherein said timer means includes means for varying said predetermined time period as a function of temperature whereby said predetermined time period is longer at lower temperatures and shorter at higher temperatures.

12. Compressed air system as claimed in claim 11, wherein said signal generating means includes a timing device responsive to said timer means to generate said compressor control signal and said purge control signal for a predetermined time interval in response to the timer means in the absence of said pressure control signal.

* * * * *